Feb. 16, 1954    R. G. BALLARD    2,669,123
MASS MEASURING LIQUID LEVEL FLOAT GAUGE
Filed Jan. 6, 1949    2 Sheets-Sheet 1
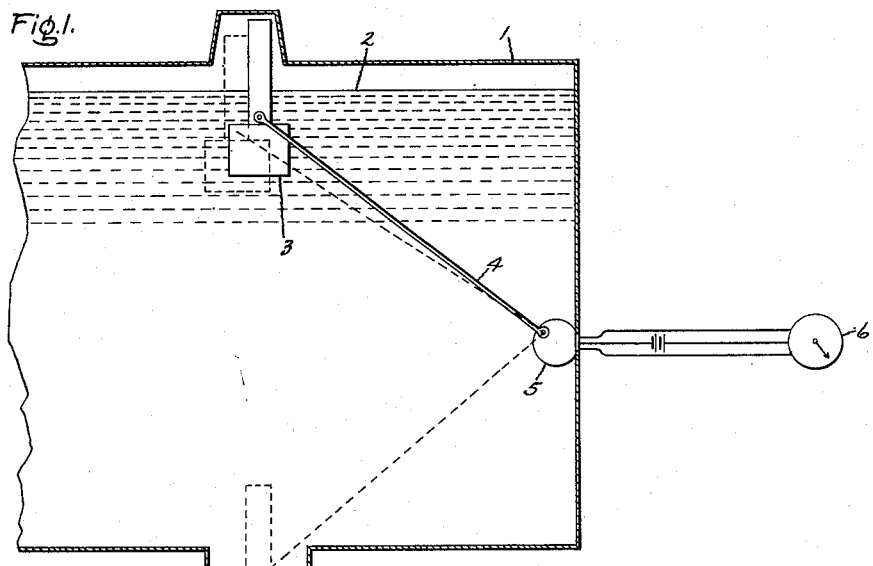
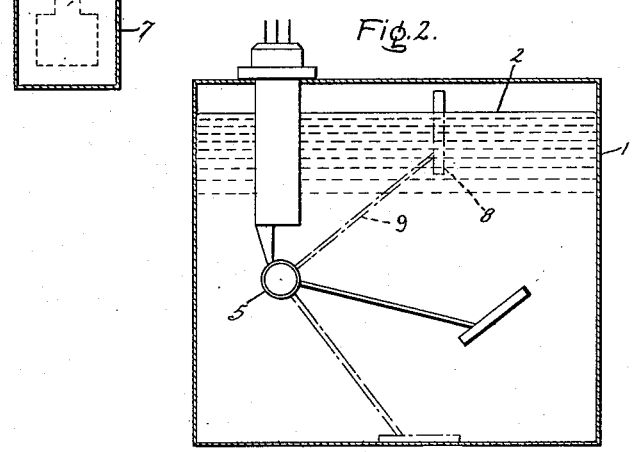
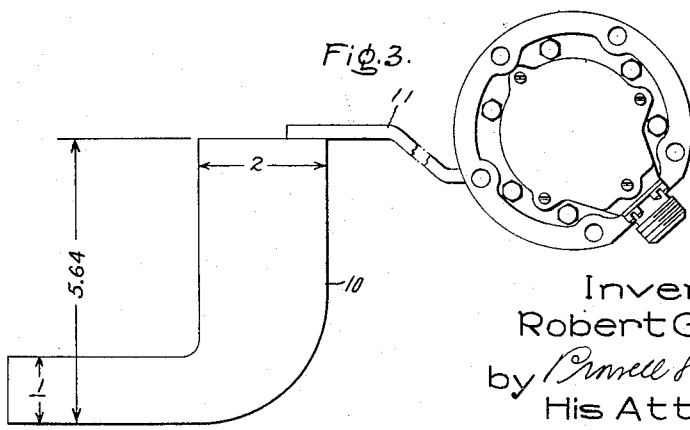
Inventor:
Robert G. Ballard,
by Purcell & Mack
His Attorney.

Feb. 16, 1954 R. G. BALLARD 2,669,123
MASS MEASURING LIQUID LEVEL FLOAT GAUGE
Filed Jan. 6, 1949 2 Sheets-Sheet 2
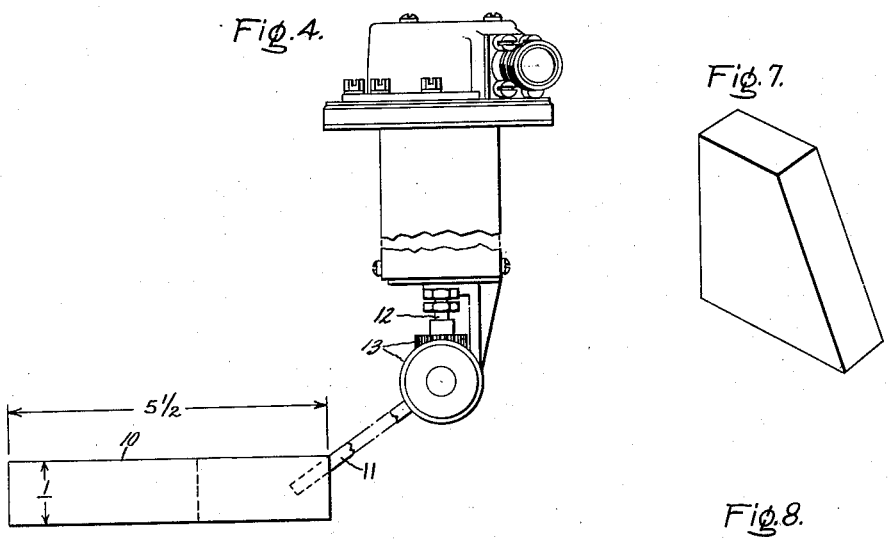
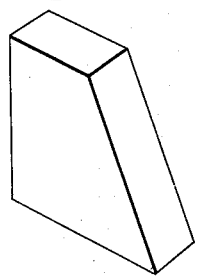
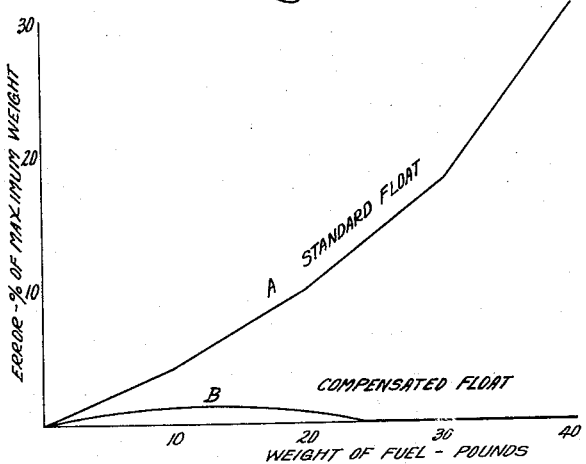
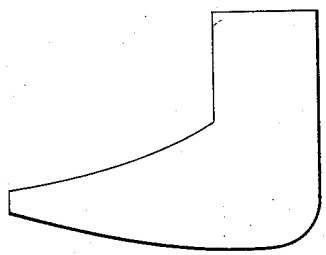
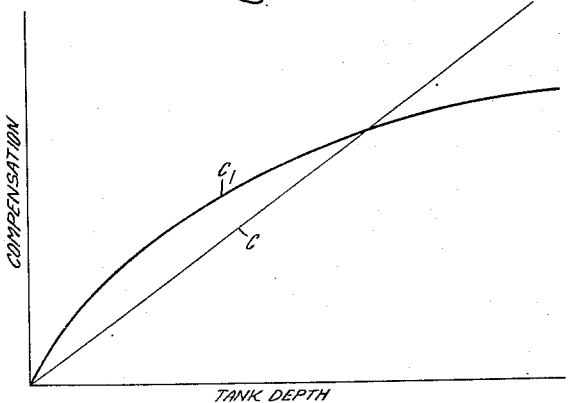
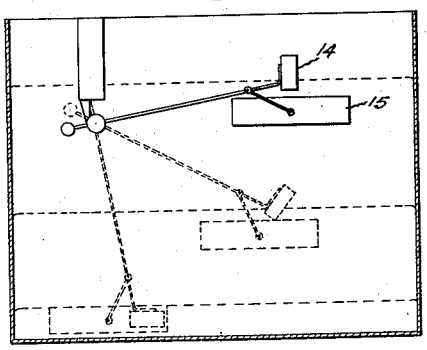
Inventor:
Robert G. Ballard,
by his Attorney.

Patented Feb. 16, 1954

2,669,123

UNITED STATES PATENT OFFICE 2,669,123

MASS MEASURING LIQUID LEVEL
FLOAT GAUGE

Robert G. Ballard, Saugus, Mass., assignor to General Electric Company, a corporation of New York Application January 6, 1949, Serial No. 69,535

2 Claims. (Cl. 73—317)

My invention relates to liquid level float gauges and its object is to provide such a gauge which is compensated for changes in the specific gravity of the liquid being measured, in order that the gauge will measure mass of liquid as distinguished from volume of liquid.

My invention will be described as applied to the measurement of liquid fuel in tanks. In general, the amount of available fuel energy in a given volume of liquid fuel, such as gasoline, is proportional to its mass or specific gravity. The specific gravity of such liquid fuels varies appreciably, due to different grades and also due to variations in temperature. If the gasoline in a tank be measured by the usual type of float gauge, the volume of the liquid is measured, but the actual fuel energy available may vary as much as 10 per cent by reason of differences in specific gravity of the gasoline. My invention provides a float type gauge compensated for such variations so as to measure the mass regardless of changes in specific gravity and volume. In carrying my invention into effect, I employ a float which has a hydrometer characteristic to the extent necessary for the compensation required and which characteristic is automatically varied in proportion to the depth of the liquid being measured, so as to provide the correct amount of compensation at all depths.

The features of my invention which are believed to be novel and patentable will be pointed out in the claims appended hereto. For a better understanding of my invention reference is made in the following description to the accompanying drawing in which Fig. 1 is an explanatory diagram indicative of the operation of a hydrometer type of float gauge which is defective in that it gives the same amount of compensation for all tank depths. Fig. 2 represents a hydrometer type of float gauge illustrating the principles of my invention in that it gives compensation for changes in specific gravity in proportion to the liquid depth. Figs. 3 and 4 are plan and side views illustrating a preferred embodiment of my invention, and Fig. 5 represents comparative mass accuracy measurement curves for uncompensated and compensated float gauges. Fig. 6 shows compensation-depth curves for tanks having uniform and nonuniform liquid surface areas at different depths. Fig. 7 illustrates a tank requiring the compensation conforming to curve C' of Fig. 6. Fig. 8 illustrates a compensated float of the shape required in a tank such as illustrated in Fig. 7, and Fig. 9 represents a float gauge embodying my invention where the float is divided into two parts, a compensating part and a non-compensating main float part.

Referring to Fig. 1, let 1 represent a liquid tank practically filled with a liquid 2. Let it be assumed that it is desired to measure the mass of the liquid in the tank as the level varies by a float gauge, such as represented. The gauge consists of a float 3 operating a lever 4, assumed to be coupled to an electric form of transmitter 5 which transmits the measurement electrically to a suitable receiver 6. The connection between float 3 and lever 4 is assumed to be a pivoted connection so that the float always remains upright as illustrated. The float is represented as being of a hydrometer type in that its floating position near the surface of the liquid rises and falls with increases and decreases in the specific gravity of the liquid, and to this extent it embodies a feature of my invention. To obtain correct compensation for a full tank, the float should rise and fall with changes in specific gravity by the same percentage as the liquid depth changes. Thus my mass measuring float has a hydrometer characteristic and action which is equal to the change in depth of a given mass of the liquid which is due solely to changes in density. For instance, if a given mass of liquid has a depth of 10 feet and increases to a depth of 10 feet, 4 inches due to a decrease in density and corresponding increase in volume, the float will sink 4 inches lower into the surface of the liquid and thus retain its same gauging position.

Assume that with a given volume of liquid 2 having a certain specific gravity, the float 3 floats at the depth represented in full lines in Fig. 1, and that the tank depth of the liquid 2 is 50 inches, and that the tank has a uniform liquid surface area from top to bottom. Now assume we replace the liquid with an equal volume of another liquid 2a having a specific gravity five per per cent less than the liquid first assumed. Because of the lighter liquid the float 3 will sink as indicated by dotted lines in Fig. 1. The mass or weight of the second liquid 2a is five per cent less than the mass of an equal volume of the first liquid 2, and hence to obtain correct compensation, the float 3 should fall five per cent of 50 inches, or 2½ inches. This assumes a linear relation between float movement and the telemetering operation.

The mass of liquid 2a is five per cent less than the mass of liquid 2 for the same volume and tank depth when the tank is full, and it is a simple matter to design a hydrometer type float so weighted and shaped that it will displace more liquid and sink 2½ inches under the change in specific gravity assumed. The receiver 6 will thus correctly indicate the mass of liquid when the tank is full, regardless of changes in specific gravity. Such a system will be correctly compensated only when the tank is full, because it will give the same compensation at all other tank depths including an empty condition where no compensation is desired. Thus assume the tank to be empty but that the recess 7 provided at the bottom for the float first contains liquid 2, and that this is then changed for the lighter liquid 2a. It is apparent that the float described will fall 2½ inches in recess 7 when the specific gravity of the liquid therein is changed from liquid 2 to liquid 2a.

This will produce an erroneous reading near zero values, and with a heavy liquid contained in depression 7, may cause an erroneous indication of a considerable amount of liquid remaining in the tank when, in fact, it is empty. When the tank is half full, to obtain correct compensation, the float should fall 1¼ inches instead of 2½ inches under the change in specific gravity assumed. Hence, the arrangement of Fig. 1 is defective because it gives correct compensation only at full tank conditions, and does not decrease the compensation with decreasing liquid depth as it should correctly to measure liquid mass.

This additional requirement is provided for in the embodiment of my invention represented in Fig. 2.

In Fig. 2 the float 8 consists of a sealed, hollow, elongated element fastened rigidly to the lever arm 9 which operates the transmitter element 5. The float 8 is so angularly related to arm 9 that its elongated axis stands approximately erect when in the full tank position and is flat in the empty tank position as shown in dotted lines. At intermediate positions the longitudinal axis of the float 8 is inclined from the vertical position in proportion to liquid depth as indicated in full lines for about one-fourth full tank conditions.

The float is so weighted that at the full tank or upright position of the float it has the necessary hydrometer action correctly to compensate for changes in specific gravity of the liquid to measure liquid mass. Thus, if the hydrometer action is not sufficient, weight is added thereto so that the float becomes more nearly equal to the weight of the liquid per unit volume thereby increasing its hydrometer sensitivity. It will be apparent that as the liquid and float fall from the full to empty tank condition, the hydrometer action of the float decreases accordingly, and at the empty tank condition when the float is flat, its hydrometer action will be negligible. Hence, in this device the compensation for changes in specific gravity is in direct proportion to the depth of the liquid in the tank, which is necessary for a correct mass measuring float gauge of this type.

In Figs. 3 and 4, I have shown plan and side views of the hydrometer compensated float 10 for a gasoline tank which tank has a uniform surface area at all depths and a full depth of 10 inches. For this depth of tank the lever arm 11 to which the float 10 is rigidly fastened will have a length of 4½ inches. The dimensions indicated in Figs. 3 and 4 for the float 10 are indicated in inches. The float may be made of hollow sealed brass and have a weight of 0.3 pound and a volume of 11.9 cubic inches. The float is L-shaped and secured to arm 11 so that it lies flat on its side in the empty tank condition shown in Fig. 4. In the full tank condition the arm of the smaller cross section will be substantially erect and extend from 1 to 2½ inches out of the gasoline for changes in specific gravity of 10%. As indicated in Fig. 4, the arm 11 is geared to a vertical transmitter shaft 12 by gears at 13. The transmitter and telemetering system used may be of the variable resistance type such, for example, as is described in my United States Patent No. 2,333,406, November 2, 1943. It will be apparent that the relation between angular movement of the transmitter shaft 12 and the vertical movement of float 10 will not be exactly linear but will vary with the angular position of the arm 11 from a horizontal position. This variation from linear relation may be taken care of in the calibration of the scale of the receiver, or in the proper graduation of the resistance employed in the transmitter without difficulty.

The curves of Fig. 5 are explained as follows: A tank of uniform cross-sectional area from top to bottom is provided with two float gauges designated a and b. Gauge a is an ordinary, standard, uncompensated float gauge; and gauge b is provided with the hydrometer compensation of my invention. Forty pounds of water are first slowly poured into the tank and both gauges are accurately calibrated to measure the mass of water. Now the water is drained out and replaced by an equal mass of gasoline (40 pounds) and as the gasoline is poured in, the two gauges are tested for accuracy. The curves A and B show the test result for the uncompensated and compensated gauges respectively. The ordinates represent error in per cent of maximum weight (40 pounds), and the abscissas represent the number of pounds of gasoline in the tank. The compensated gauge gives practically the same liquid mass measurement results as when calibrated with water; i. e., the error (curve B) is negligible. However, the uncompensated gauge has a very serious error (curve A) which increases from zero error when the tank is empty to about 30 per cent when the tank contains 40 pounds of gasoline. Thus the uncompensated gauge would indicate a gasoline fuel content in the tank of 40+30% of 40=52 pounds of gasoline, whereas only 40 pounds are present although the volume is considerably more than 40 pounds of water. Curve A would also vary to some extent if the temperature of the gasoline were changed materially, as this changes the volume. However, with a hydrometer compensated gauge, changes in volume due to temperature changes cause no error in the mass measurement.

In the foregoing description, it was assumed that the tanks discussed were of uniform cross-sectional area from top to bottom. In such cases the compensation referred to should have a linear relation with liquid depth as represented in curve C of Fig. 6. This may be stated in another way, thus: The compensation should have a linear relation with the liquid depth multiplied by a factor corresponding to the ratio of tank cross-sectional area at the various depths to tank volume. If this factor is constant as in the tank of uniform cross section, then the factor may be considered unity and ignored. If, however, the cross-sectional area varies from top to bottom as it may in some airplane gasoline tanks, this factor must be considered.

Assume, for example, that the tank of Fig. 2 instead of being of uniform cross section is shaped as represented in Fig. 7 so as to be of smaller cross-sectional area at the top than at the bottom. In such a case the correct compensation tank depth plot would be curved as in curve $C_1$, Fig. 6. The shape and control of the compensated float would then be tailored to produce the required compensation. For instance, the float of Fig. 3 would be tapered more toward its outer end so as to increase the compensating effect in the larger lower portion of the tank and decrease the compensating effect when in the smaller upper portion of the tank, as indicated in Fig. 8. Some cut-and-try procedure may be required to obtain the right compensating float for odd shaped tanks, but there is no fundamental difficulty involved in applying my invention to a wide variety of different shaped tanks.

The float may be made in two sections as shown in Fig. 9, one section 14 elongated and fixed to the float lever arm and proportioned to obtain the desired compensation, and a second portion 15 hinged to the float lever arm and used solely as the noncompensated float. In general the compensating portion 14 should have a length proportional to the depth of the tank in which it is to be used and the liquid density variation to be encountered, and of a cross-sectional area from top to bottom corresponding to the top to bottom cross-sectional area of the tank. Its liquid displacement weight should be of course, properly related to the density range of the liquid in which it is to be used so as to be effective.

What I claim as new and desire to secure by Letters Patent of the United States is:

1. Liquid mass measuring float gauge apparatus for a liquid storage tank, comprising a pivot arm; means supporting said pivot arm for angular movement of one end thereof in said tank in a vertical plane and about an axis fixed in relation to said tank; a uniform-thickness substantially L-shaped hydrometer float fixedly secured to said end of said pivot arm such that said float lies flat in said tank in the empty condition of said tank and such that one arm of said L-shaped float extends substantially normal to the surface of liquid in said tank in the full condition of said tank, said one arm of said L-shaped float being shaped to have widths from its free end to the junction with the other arm of said float which are substantially proportional to the volume of said tank at levels from empty to full conditions of said tank, and said other arm of said float having a volume which buoys said float such that said one arm of said float just projects fully out of the liquid in said tank when said tank is in the full condition and filled with the densest liquid used with said tank; and means translating the angular orientations of said pivot arm about said axis into liquid mass indications.

2. Float gauge apparatus for measuring total mass of liquids of various levels in a storage tank independently of liquid density variations, comprising a pivot arm; means supporting said pivot arm for angular movement of one end thereof in said tank in a vertical plane and about an axis fixed in relation to said tank; a uniform-thickness elongated hydrometer float having two integral float portions; means fixedly securing said hydrometer float to said end of said pivot arm such that said float lies flat in said tank in the empty condition of said tank and such that at least one of said portions of said float extends substantially normal to the surface of liquid in said tank in the full condition of said tank; said one portion of said float being shaped to have widths from its free end to the junction with the other portion of said float which are substantially proportional to the volume of said tank at levels from empty to full conditions of said tank, and said other portion of said float having a volume which buoys said float such that said one portion of said float just projects fully out of the liquid in said tank when said tank is in the full condition and filled with the densest liquid used with said tank; and means translating the angular orientations of said pivot arm about said axis into liquid mass indications.

ROBERT G. BALLARD.

References Cited in the file of this patent

UNITED STATES PATENTS

| Number | Name | Date |
|---|---|---|
| Re. 18,514 | Reeves | July 5, 1932 |
| 794,697 | Beck et al. | July 11, 1905 |
| 1,141,500 | Stahle | June 1, 1915 |
| 1,278,910 | Gregory | Sept. 17, 1918 |
| 1,729,770 | Eynan | Oct. 1, 1929 |
| 1,757,061 | Sartakoff | May 6, 1930 |
| 2,460,503 | Howe | Feb. 1, 1949 |

FOREIGN PATENTS

| Number | Country | Date |
|---|---|---|
| 15,300 | Great Britain | July 25, 1905 |
| 576,586 | France | May 15, 1924 |